US012097519B2

(12) United States Patent
Volk et al.

(10) Patent No.: US 12,097,519 B2
(45) Date of Patent: Sep. 24, 2024

(54) SEALING ELEMENT FOR SEALING A TRANSITION BETWEEN A SPRAY GUN BODY AND AN ATTACHMENT OF A SPRAY GUN, ATTACHMENT, IN PARTICULAR A PAINT NOZZLE ARRANGEMENT FOR A SPRAY GUN AND A SPRAY GUN, IN PARTICULAR A PAINT SPRAY GUN

(71) Applicant: SATA GmbH & Co. KG, Kornwestheim (DE)

(72) Inventors: Eva Volk, Kornwestheim (DE); Norbert Maier, Kornwestheim (DE); Stefan Gehret, Kornwestheim (DE)

(73) Assignee: SATA GmbH & Co. KG, Kornwestheim (DE)

(*) Notice: Subject to any disclaimer, the term of this patent is extended or adjusted under 35 U.S.C. 154(b) by 402 days.

(21) Appl. No.: 17/410,124

(22) Filed: Aug. 24, 2021

(65) Prior Publication Data

US 2022/0080448 A1 Mar. 17, 2022

(30) Foreign Application Priority Data

Sep. 11, 2020 (DE) ........................ 102020123769.3

(51) Int. Cl.

*B05B 15/65* (2018.01)
*B05B 7/08* (2006.01)
*B05B 7/24* (2006.01)

(52) U.S. Cl.

CPC ............ *B05B 15/65* (2018.02); *B05B 7/0815* (2013.01); *B05B 7/2478* (2013.01)

(58) Field of Classification Search

CPC ...... B05B 15/65; B05B 7/0815; B05B 7/2478

(Continued)

(56) References Cited

U.S. PATENT DOCUMENTS

| | | | |
|---|---|---|---|
| 40,433 | A | 10/1863 | Sees |
| 327,260 | A | 9/1885 | Hart |

(Continued)

FOREIGN PATENT DOCUMENTS

| | | |
|---|---|---|
| AT | 153883 | 6/1997 |
| AT | 163577 | 3/1998 |

(Continued)

OTHER PUBLICATIONS

Search Report dated Jan. 26, 2022, for Chinese Patent Appl. No. 2019107032612 with translation.

(Continued)

*Primary Examiner* — Christopher S Kim

(74) *Attorney, Agent, or Firm* — Paul D. Bianco; Thomas S. Grzesik; Fleit Intellectual Property Law

(57) ABSTRACT

A sealing element seals a transition between a body of a spray gun, in particular a paint spray gun, and an attachment of a spray gun, in particular a paint spray gun, in particular a paint nozzle. The sealing element is configured so that it forms an axially acting sealing surface and a radially acting sealing surface with the body and/or the attachment when the attachment is arranged in body. An attachment, in particular a paint nozzle arrangement for a spray gun, in particular a paint spray gun, and a spray gun, in particular a paint spray gun can each have such a sealing element. Due to the axially acting sealing surface and the radially acting sealing surface, the sealing element provides a significantly improved sealing effect relative to sealing elements of the prior art.

20 Claims, 4 Drawing Sheets

(58) Field of Classification Search
USPC .......................................... 239/525–528, 600
See application file for complete search history.

(56) References Cited

U.S. PATENT DOCUMENTS 459,432 A 9/1891 Anderson
459,433 A 9/1891 Avery
548,816 A 10/1895 Paul
552,213 A 12/1895 Troy
552,715 A 1/1896 Lugrin
563,505 A 7/1896 McCornack
581,107 A 4/1897 Emery
644,803 A 3/1900 Justi
672,012 A 4/1901 Ruper
574,880 A 5/1901 Schmidt et al.
1,662,496 A 3/1928 Forsgard
1,703,383 A 2/1929 Birkenmaier
1,703,384 A 2/1929 Birkenmaier
1,711,221 A 4/1929 Blakeslee
1,751,787 A 3/1930 Binks
1,889,201 A 11/1932 Holveck
2,004,303 A 6/1935 Wahlin
2,008,381 A 7/1935 Beeg
2,049,700 A 8/1936 Gustafsson
2,051,210 A 8/1936 Gustafsson
2,070,696 A 2/1937 Tracy
2,116,036 A 5/1938 Money
2,125,445 A 8/1938 Holveck
2,198,441 A 4/1940 Mollart
2,204,599 A 6/1940 Jenkins
2,269,057 A 1/1942 Jenkins
D133,223 S 7/1942 Tammen
2,356,865 A 8/1944 Mason
2,416,856 A 3/1947 Thomsen
2,416,923 A 3/1947 Jenkins
2,470,718 A 5/1949 Peeps
2,533,953 A 12/1950 Peeps
2,557,593 A 6/1951 Bjorkman
2,557,606 A 6/1951 Liedberg
2,559,091 A 7/1951 Reasenberg
2,609,961 A 9/1952 Sapien
2,612,899 A 10/1952 Webb
2,646,314 A 7/1953 Peeps
2,721,004 A 10/1955 Schultz
2,743,963 A 5/1956 Peeps
2,844,267 A 7/1958 Petriccione
2,886,252 A 5/1959 Ehrensperger
3,090,530 A 5/1963 Peeps
D196,477 S 10/1963 Kelly
3,159,472 A 12/1964 Revell
D200,594 S 3/1965 Sass
3,240,398 A 3/1966 Dalton, Jr.
D204,306 S 4/1966 Hamm
D205,760 S 9/1966 Hocutt et al.
D208,903 S 10/1967 Zadron et al.
3,344,992 A 10/1967 Norris
3,381,845 A 5/1968 MacDonald
3,417,650 A 12/1968 Varrin
3,420,106 A 1/1969 Keller et al.
3,435,683 A 4/1969 Keller et al.
3,482,781 A 12/1969 Sharpe
D217,928 S 6/1970 Felske
3,524,589 A 8/1970 Pelton, Jr.
3,527,372 A 9/1970 Manning
3,583,632 A 6/1971 Schaffer
3,622,078 A 11/1971 Gronert
3,645,562 A 2/1972 Fandetti et al.
3,656,493 A 4/1972 Black et al.
3,714,967 A 2/1973 Zupan et al.
3,746,253 A 7/1973 Walberg
3,747,850 A 7/1973 Hastings et al.
3,771,539 A 11/1973 De Santis
3,840,143 A 10/1974 Davis et al.
3,848,807 A 11/1974 Partida
3,857,511 A 12/1974 Govindan
3,870,223 A 3/1975 Wyant
3,873,023 A 3/1975 Moss et al.
3,938,739 A 2/1976 Bertilsson et al.
4,000,915 A 1/1977 Strom
D245,048 S 7/1977 Pool
D252,097 S 6/1979 Probst et al.
4,160,525 A 7/1979 Wagner
4,171,091 A 10/1979 van Hardeveld et al.
4,210,263 A 7/1980 Bos
4,273,293 A 6/1981 Hastings
4,278,276 A 7/1981 Ekman
4,411,387 A 10/1983 Stern et al.
4,478,370 A 10/1984 Hastings
D276,472 S 11/1984 Harrison
D278,543 S 4/1985 Gintz
4,545,536 A 10/1985 Avidon
4,562,965 A 1/1986 Ihmels et al.
4,572,437 A 2/1986 Huber et al.
4,580,035 A 4/1986 Luscher
4,585,168 A 4/1986 Even et al.
4,614,300 A 9/1986 Falcoff
4,643,330 A 2/1987 Kennedy
4,653,661 A 3/1987 Buchner et al.
4,667,878 A 5/1987 Behr
4,713,257 A 12/1987 Luttermoeller
D293,950 S 1/1988 Ogden et al.
4,730,753 A 3/1988 Grime
4,767,057 A 8/1988 Degli
D298,372 S 11/1988 Taylor, Jr.
4,784,184 A 11/1988 Gates
4,806,736 A 2/1989 Schirico
4,826,539 A 5/1989 Harpold
4,832,232 A 5/1989 Broccoli
4,844,347 A 7/1989 Konhäuser
4,854,504 A 8/1989 Hedger, Jr. et al.
4,863,781 A 9/1989 Kronzer
4,877,144 A 10/1989 Thanisch
D305,057 S 12/1989 Morgan
4,887,747 A 12/1989 Ostrowsky et al.
4,901,761 A 2/1990 Taylor
4,906,151 A 3/1990 Kubis
4,917,300 A 4/1990 Gloviak et al.
4,946,075 A 8/1990 Lundback
4,964,361 A 10/1990 Aebersold
4,967,600 A 11/1990 Keller
4,969,603 A 11/1990 Norman
4,973,184 A 11/1990 La Salle
D314,421 S 2/1991 Tajima et al.
D314,588 S 2/1991 Denham
4,989,787 A 2/1991 Nikkel et al.
5,020,700 A 6/1991 Krzywdziak et al.
D318,877 S 8/1991 Miranda et al.
5,042,840 A 8/1991 Rieple et al.
D321,597 S 11/1991 Cerny
5,064,119 A 11/1991 Mellette
5,071,074 A 12/1991 Lind
5,074,334 A 12/1991 Onodera
5,078,323 A 1/1992 Frank
5,080,285 A 1/1992 Toth
5,088,648 A 2/1992 Schmon
5,090,623 A 2/1992 Burns et al.
5,102,045 A 4/1992 Diana
5,119,992 A 6/1992 Grime
5,125,391 A 6/1992 Srivastava et al.
5,135,124 A 8/1992 Wobser
5,143,102 A 9/1992 Blaul
5,165,605 A 11/1992 Morita et al.
5,170,941 A 12/1992 Morita et al.
5,190,219 A 3/1993 Copp, Jr.
5,191,797 A 3/1993 Smith
5,209,405 A 5/1993 Robinson
5,228,488 A 7/1993 Fletcher
5,232,299 A 8/1993 Hiss
5,236,128 A 8/1993 Morita et al.
5,249,746 A 10/1993 Kaneko et al.
D341,186 S 11/1993 Albers
5,289,974 A 3/1994 Grime et al.
5,322,221 A 6/1994 Anderson
5,325,473 A 6/1994 Monroe et al.

(56) References Cited

U.S. PATENT DOCUMENTS

| | | | | |
|---|---|---|---|---|
| 5,332,156 | A | | 7/1994 | Wheeler |
| 5,333,506 | A | | 8/1994 | Smith et al. |
| 5,333,908 | A | | 8/1994 | Dorney et al. |
| 5,344,078 | A | | 9/1994 | Fritz et al. |
| 5,367,148 | A | | 11/1994 | Storch et al. |
| D353,836 | S | | 12/1994 | Carvelli et al. |
| 5,381,962 | A | | 1/1995 | Teague |
| 5,435,491 | A | | 7/1995 | Sakuma |
| 5,443,642 | A | | 8/1995 | Bienduga |
| 5,456,414 | A | | 10/1995 | Burns |
| D365,952 | S | | 1/1996 | Gagnon et al. |
| 5,503,439 | A | | 4/1996 | LaJeunesse et al. |
| 5,529,245 | A | | 6/1996 | Brown |
| 5,533,674 | A | | 7/1996 | Feyrer et al. |
| 5,540,385 | A | | 7/1996 | Garlick |
| 5,540,386 | A | | 7/1996 | Roman |
| D376,637 | S | | 12/1996 | Kieffer |
| 5,582,350 | A | | 12/1996 | Kosmyna et al. |
| 5,584,899 | A | | 12/1996 | Shorts |
| 5,588,562 | A | | 12/1996 | Sander et al. |
| 5,592,597 | A | | 1/1997 | Kiss |
| 5,609,302 | A | | 3/1997 | Smith |
| 5,613,637 | A | | 3/1997 | Schmon |
| D380,301 | S | | 7/1997 | Kogutt |
| 5,655,714 | A | | 8/1997 | Kieffer et al. |
| 5,662,444 | A | | 9/1997 | Schmidt, Jr. |
| 5,667,143 | A | | 9/1997 | Sebion et al. |
| 5,695,125 | A | | 12/1997 | Kumar |
| 5,704,381 | A | | 1/1998 | Millan et al. |
| 5,718,767 | A | | 2/1998 | Crum et al. |
| D391,403 | S | | 3/1998 | Josephs |
| 5,725,161 | A | | 3/1998 | Hartle |
| RE35,769 | E | | 4/1998 | Grime et al. |
| 5,755,363 | A | | 5/1998 | Gantner et al. |
| 5,762,228 | A | | 6/1998 | Morgan et al. |
| 5,803,360 | A | | 9/1998 | Spitznagel |
| 5,816,501 | A | | 10/1998 | LoPresti et al. |
| 5,829,682 | A | | 11/1998 | Haruch |
| 5,836,517 | A | | 11/1998 | Burns et al. |
| D402,820 | S | | 12/1998 | Morison et al. |
| 5,843,515 | A | | 12/1998 | Crum et al. |
| 5,853,014 | A | | 12/1998 | Rosenauer |
| D405,503 | S | | 2/1999 | Edo |
| 5,874,680 | A | | 2/1999 | Moore |
| 5,884,006 | A | | 3/1999 | Frohlich et al. |
| D409,719 | S | | 5/1999 | Kaneko |
| 5,941,461 | A | | 8/1999 | Akin et al. |
| 5,951,190 | A | | 9/1999 | Wilson |
| 5,951,296 | A | | 9/1999 | Klein |
| 5,954,268 | A | | 9/1999 | Joshi et al. |
| D414,636 | S | | 10/1999 | Wiese |
| 5,979,797 | A | | 11/1999 | Castellano |
| 5,992,763 | A | | 11/1999 | Smith et al. |
| 6,006,930 | A | | 12/1999 | Dreyer et al. |
| 6,010,082 | A | | 1/2000 | Peterson |
| 6,017,394 | A | | 1/2000 | Crum et al. |
| 6,019,294 | A | | 2/2000 | Anderson |
| 6,036,109 | A | | 3/2000 | DeYoung |
| 6,039,218 | A | | 3/2000 | Beck |
| 6,050,499 | A | | 4/2000 | Takayama |
| 6,053,429 | A | | 4/2000 | Chang |
| 6,056,213 | A | | 5/2000 | Ruta et al. |
| 6,056,215 | A | | 5/2000 | Hansinger |
| 6,089,471 | A | | 7/2000 | Scholl |
| 6,089,607 | A | | 7/2000 | Keeney et al. |
| 6,091,053 | A | | 7/2000 | Aonuma |
| 6,092,740 | A | | 7/2000 | Liu |
| 6,105,881 | A | * | 8/2000 | Kitajima ............... B05B 7/2435 239/371 |
| 6,132,511 | A | | 10/2000 | Crum et al. |
| D435,379 | S | | 12/2000 | Nguyen |
| 6,230,986 | B1 | | 5/2001 | Vacher et al. |
| 6,250,567 | B1 | | 6/2001 | Lewis et al. |
| 6,267,301 | B1 | | 7/2001 | Haruch |
| 6,276,616 | B1 | | 8/2001 | Jenkins |
| D448,451 | S | | 9/2001 | Turnbull et al. |
| 6,308,991 | B1 | | 10/2001 | Royer |
| D457,599 | S | | 5/2002 | Karwoski et al. |
| D459,432 | S | | 6/2002 | Schmon |
| D459,433 | S | | 6/2002 | Schmon |
| 6,402,058 | B2 | | 6/2002 | Kaneko et al. |
| 6,402,062 | B1 | | 6/2002 | Bending et al. |
| 6,431,466 | B1 | | 8/2002 | Kitajima |
| 6,435,426 | B1 | | 8/2002 | Copp, Jr. |
| 6,442,276 | B1 | | 8/2002 | Doljack |
| 6,450,422 | B1 | | 9/2002 | Maggio |
| 6,494,387 | B1 | | 12/2002 | Kaneko |
| 6,536,684 | B1 | | 3/2003 | Wei |
| 6,536,687 | B1 | | 3/2003 | Navis et al. |
| D472,730 | S | | 4/2003 | Sparkowski |
| 6,540,114 | B1 | | 4/2003 | Popovich et al. |
| 6,543,632 | B1 | | 4/2003 | McIntyre et al. |
| 6,547,160 | B1 | | 4/2003 | Huang |
| 6,547,884 | B1 | | 4/2003 | Crum et al. |
| 6,553,712 | B1 | | 4/2003 | Majerowski et al. |
| 6,554,009 | B1 | | 4/2003 | Beijbom et al. |
| D474,528 | S | | 5/2003 | Huang |
| 6,585,173 | B2 | | 7/2003 | Schmon et al. |
| 6,595,441 | B2 | | 7/2003 | Petrie et al. |
| 6,612,506 | B1 | | 9/2003 | Huang |
| 6,626,382 | B1 | | 9/2003 | Liu |
| 6,626,383 | B1 | | 9/2003 | Campbell |
| 6,647,997 | B2 | | 11/2003 | Mohn |
| 6,661,438 | B1 | | 12/2003 | Shiraishi et al. |
| D485,685 | S | | 1/2004 | Zupkofska et al. |
| 6,675,845 | B2 | | 1/2004 | Volpenheim et al. |
| 6,692,118 | B2 | | 2/2004 | Michele et al. |
| 6,712,292 | B1 | | 3/2004 | Gosis et al. |
| 6,717,584 | B2 | | 4/2004 | Kulczycka |
| 6,732,751 | B2 | | 5/2004 | Chiang |
| 6,763,964 | B1 | | 7/2004 | Hurlbut et al. |
| 6,766,763 | B2 | | 7/2004 | Crum et al. |
| 6,786,345 | B2 | | 9/2004 | Richards |
| 6,796,514 | B1 | | 9/2004 | Schwartz |
| 6,801,211 | B2 | | 10/2004 | Forsline et al. |
| 6,820,824 | B1 | | 11/2004 | Joseph et al. |
| 6,843,390 | B1 | | 1/2005 | Bristor |
| 6,845,924 | B2 | | 1/2005 | Schmon |
| 6,855,173 | B2 | | 2/2005 | Ehrnsperger et al. |
| 6,863,310 | B1 | | 3/2005 | Petkovsek |
| 6,863,920 | B2 | | 3/2005 | Crum et al. |
| 6,874,656 | B2 | | 4/2005 | Rohr et al. |
| 6,874,664 | B1 | | 4/2005 | Montgomery |
| 6,874,708 | B2 | | 4/2005 | Reetz, III |
| 6,877,677 | B2 | | 4/2005 | Schmon et al. |
| 6,929,019 | B2 | | 8/2005 | Weinmann et al. |
| 6,945,429 | B2 | | 9/2005 | Gosis et al. |
| 6,955,180 | B2 | | 10/2005 | Kocherlakota et al. |
| 6,962,432 | B2 | | 11/2005 | Hofeldt |
| 6,963,331 | B1 | | 11/2005 | Kobayashi et al. |
| 7,017,838 | B2 | | 3/2006 | Schmon |
| 7,018,154 | B2 | | 3/2006 | Schmon |
| D519,687 | S | | 4/2006 | Zahav |
| 7,032,839 | B2 | | 4/2006 | Blette et al. |
| 7,036,752 | B1 | | 5/2006 | Hsiang |
| 7,083,119 | B2 | | 8/2006 | Bouic et al. |
| 7,090,148 | B2 | | 8/2006 | Petrie et al. |
| 7,097,118 | B1 | | 8/2006 | Huang |
| D528,192 | S | | 9/2006 | Nicholson |
| 7,106,343 | B1 | | 9/2006 | Hickman |
| 7,165,732 | B2 | | 1/2007 | Kosmyna et al. |
| 7,172,139 | B2 | | 2/2007 | Bouic et al. |
| 7,175,110 | B2 | | 2/2007 | Vicentini |
| 7,182,213 | B2 | | 2/2007 | King |
| D538,050 | S | | 3/2007 | Tardif |
| D538,493 | S | | 3/2007 | Zimmerle et al. |
| D538,886 | S | | 3/2007 | Huang |
| 7,194,829 | B2 | | 3/2007 | Boire et al. |
| D541,053 | S | | 4/2007 | Sanders |
| D541,088 | S | | 4/2007 | Nesci |
| 7,201,336 | B2 | | 4/2007 | Blette et al. |
| 7,216,813 | B2 | | 5/2007 | Rogers |
| D545,943 | S | | 7/2007 | Rodgers et al. |
| 7,246,713 | B2 | | 7/2007 | King |

(56) References Cited

U.S. PATENT DOCUMENTS

| | | | |
|---|---|---|---|
| 7,249,519 | B2 | 7/2007 | Rogers |
| D548,816 | S | 8/2007 | Schmon |
| 7,255,293 | B2 | 8/2007 | Dodd |
| 7,264,131 | B2 | 9/2007 | Tsutsumi et al. |
| D552,213 | S | 10/2007 | Schmon |
| D552,715 | S | 10/2007 | Schmon |
| D554,703 | S | 11/2007 | Josephson |
| 7,328,855 | B2 | 2/2008 | Chatron et al. |
| D563,505 | S | 3/2008 | Schmon |
| 7,374,111 | B2 | 5/2008 | Joseph et al. |
| D571,463 | S | 6/2008 | Chesnin |
| 7,384,004 | B2 | 6/2008 | Rogers |
| RE40,433 | E | 7/2008 | Schmon |
| D573,227 | S | 7/2008 | Mirazita et al. |
| D574,926 | S | 8/2008 | Huang |
| D575,374 | S | 8/2008 | Huang |
| 7,410,106 | B2 | 8/2008 | Escoto, Jr. et al. |
| 7,416,140 | B2 | 8/2008 | Camilleri et al. |
| 7,422,164 | B2 | 9/2008 | Matsumoto |
| D579,213 | S | 10/2008 | Aipa |
| D581,107 | S | 11/2008 | Schmon |
| D581,483 | S | 11/2008 | Bass et al. |
| D583,013 | S | 12/2008 | Wang |
| 7,458,612 | B1 | 12/2008 | Bennett |
| 7,472,840 | B2 | 1/2009 | Gregory |
| D588,231 | S | 3/2009 | Pellin |
| 7,533,678 | B2 | 5/2009 | Rosa |
| 7,540,434 | B2 | 6/2009 | Gohring et al. |
| 7,542,032 | B2 | 6/2009 | Kruse |
| 7,568,638 | B2 | 8/2009 | Gehrung |
| D604,394 | S | 11/2009 | Wang |
| 7,614,571 | B2 | 11/2009 | Camilleri et al. |
| D607,086 | S | 12/2009 | Kosaka |
| 7,624,869 | B2 | 12/2009 | Primer |
| D607,972 | S | 1/2010 | Wang |
| D608,858 | S | 1/2010 | Baltz et al. |
| D614,731 | S | 4/2010 | Wang |
| 7,694,893 | B2 | 4/2010 | Zittel et al. |
| 7,694,896 | B2 | 4/2010 | Turnbull et al. |
| D615,586 | S | 5/2010 | Kudimi |
| D616,022 | S | 5/2010 | Kudimi |
| D616,527 | S | 5/2010 | Anderson et al. |
| 7,765,876 | B1 | 8/2010 | Chen |
| D624,668 | S | 9/2010 | Noppe |
| 7,810,744 | B2 | 10/2010 | Schmon et al. |
| 7,819,341 | B2 | 10/2010 | Schmon et al. |
| D627,039 | S | 11/2010 | Yu |
| D627,432 | S | 11/2010 | Escoto et al. |
| 7,823,806 | B2 | 11/2010 | Schmon |
| D629,623 | S | 12/2010 | Lampe |
| 7,856,940 | B2 | 12/2010 | Wendler |
| 7,913,938 | B2 | 3/2011 | Cooper |
| 7,922,107 | B2 | 4/2011 | Fox |
| D637,269 | S | 5/2011 | Wang |
| D638,121 | S | 5/2011 | Villasana |
| D639,863 | S | 6/2011 | Langan |
| D641,067 | S | 7/2011 | Wang |
| D644,716 | S | 9/2011 | Gehrung |
| D644,803 | S | 9/2011 | Schmon |
| D645,094 | S | 9/2011 | Langan |
| 8,042,402 | B2 | 10/2011 | Brown et al. |
| D649,196 | S | 11/2011 | Langan |
| 8,052,071 | B2 | 11/2011 | Kruse |
| D655,347 | S | 3/2012 | Gehrung |
| 8,127,963 | B2 | 3/2012 | Gerson et al. |
| D657,276 | S | 4/2012 | Brose |
| D661,492 | S | 6/2012 | Ranschau |
| D661,742 | S | 6/2012 | Clark |
| D663,960 | S | 7/2012 | Jeronimo |
| 8,225,892 | B2 | 7/2012 | Ben-Tzvi |
| D664,773 | S | 8/2012 | Papin |
| 8,240,579 | B1 | 8/2012 | Bennett |
| 8,297,536 | B2 | 10/2012 | Ruda |
| D670,085 | S | 11/2012 | Brookman et al. |
| D671,988 | S | 12/2012 | Leipold |
| D672,012 | S | 12/2012 | Brose et al. |
| D674,880 | S | 1/2013 | Schmon |
| 8,352,744 | B2 | 1/2013 | Kruse |
| 8,360,345 | B2 | 1/2013 | Micheli |
| D681,162 | S | 4/2013 | Kruse |
| 8,444,067 | B2 | 5/2013 | Schmon et al. |
| 8,454,759 | B2 | 6/2013 | Selsvik |
| 8,481,124 | B2 | 7/2013 | Nolte et al. |
| D689,590 | S | 9/2013 | Brose |
| D689,593 | S | 9/2013 | Schmon |
| D690,799 | S | 10/2013 | Maier |
| D692,530 | S | 10/2013 | Gehrung |
| D692,532 | S | 10/2013 | Li et al. |
| 8,616,434 | B2 | 12/2013 | Wilen |
| D697,584 | S | 1/2014 | Schmon |
| D698,008 | S | 1/2014 | Schmon et al. |
| 8,626,674 | B2 | 1/2014 | Whitehouse |
| 8,642,131 | B2 | 2/2014 | Nolte et al. |
| D704,300 | S | 5/2014 | Li |
| 8,757,182 | B2 | 6/2014 | Schmon |
| 8,807,460 | B2 | 8/2014 | Charpie et al. |
| 8,857,732 | B2 | 10/2014 | Brose |
| D720,015 | S | 12/2014 | Kruse |
| D720,041 | S | 12/2014 | Robinson |
| 8,899,501 | B2 | 12/2014 | Fox et al. |
| D721,785 | S | 1/2015 | Gehrung |
| 8,925,836 | B2 | 1/2015 | Dettlaff |
| D733,369 | S | 6/2015 | Tschan |
| D733,453 | S | 7/2015 | Tschan |
| D734,428 | S | 7/2015 | Wang |
| D734,429 | S | 7/2015 | Wang |
| D734,571 | S | 7/2015 | Tschan |
| 9,073,068 | B2 | 7/2015 | Krayer et al. |
| D737,126 | S | 8/2015 | Tschan |
| D740,393 | S | 10/2015 | Gehrung |
| D745,636 | S | 12/2015 | Lin |
| 9,220,853 | B2 | 12/2015 | Vogt |
| D757,216 | S | 5/2016 | Gherung |
| D758,533 | S | 6/2016 | Dettlaff |
| D758,537 | S | 6/2016 | Gehrung |
| D768,820 | S | 10/2016 | Binz |
| D770,593 | S | 11/2016 | Gehrung |
| 9,498,788 | B2 | 11/2016 | Kosaka |
| 9,533,317 | B2 | 1/2017 | Gehrung |
| D792,557 | S | 7/2017 | Wang |
| D794,756 | S | 8/2017 | Wang |
| 9,782,784 | B2 | 10/2017 | Schmon et al. |
| 9,878,336 | B2 | 1/2018 | Gehrung |
| 9,878,340 | B2 | 1/2018 | Schmon et al. |
| D835,235 | S | 12/2018 | Gehrung et al. |
| 10,189,037 | B2 | 1/2019 | Schmon et al. |
| 10,247,313 | B2 | 4/2019 | Chien |
| 10,464,076 | B2 | 11/2019 | Sata |
| 10,471,449 | B2 | 11/2019 | Gehrung |
| 10,702,879 | B2 | 7/2020 | Gehrung |
| D929,838 | S | 9/2021 | Tschan |
| 11,141,747 | B2 | 10/2021 | Schmon |
| 2001/0004996 | A1 | 6/2001 | Schmon |
| 2001/0040192 | A1 | 11/2001 | Kaneko et al. |
| 2002/0092928 | A1 | 7/2002 | Conroy |
| 2002/0134861 | A1 | 9/2002 | Petrie et al. |
| 2002/0148501 | A1 | 10/2002 | Shieh |
| 2002/0170978 | A1 | 11/2002 | Mohn |
| 2003/0006322 | A1 | 1/2003 | Hartle et al. |
| 2003/0025000 | A1 | 2/2003 | Schmon et al. |
| 2003/0066218 | A1 | 4/2003 | Schweikert |
| 2003/0121476 | A1 | 7/2003 | McIntyre et al. |
| 2003/0127046 | A1 | 7/2003 | Zehner et al. |
| 2003/0164408 | A1 | 9/2003 | Schmon |
| 2003/0173419 | A1 | 9/2003 | Huang |
| 2003/0177979 | A1 | 9/2003 | Crum et al. |
| 2003/0189105 | A1 | 10/2003 | Schmon |
| 2003/0209568 | A1 | 11/2003 | Douglas et al. |
| 2003/0213857 | A1 | 11/2003 | Schmon et al. |
| 2003/0218596 | A1 | 11/2003 | Eschler |
| 2003/0230636 | A1 | 12/2003 | Rogers |
| 2004/0046051 | A1 | 3/2004 | Santa Cruz et al. |
| 2004/0050432 | A1 | 3/2004 | Breda |
| 2004/0104194 | A1 | 6/2004 | Dennison |

(56) References Cited

U.S. PATENT DOCUMENTS

| | | | |
|---|---|---|---|
| 2004/0129738 | A1 | 7/2004 | Stukas |
| 2004/0140373 | A1 | 7/2004 | Joseph et al. |
| 2004/0155063 | A1 | 8/2004 | Hofeldt |
| 2004/0159720 | A1 | 8/2004 | Komornicki |
| 2004/0177890 | A1 | 9/2004 | Weinmann |
| 2004/0191406 | A1 | 9/2004 | Crum et al. |
| 2004/0195382 | A1 | 10/2004 | Anderson |
| 2004/0217201 | A1 | 11/2004 | Ruda |
| 2004/0233223 | A1 | 11/2004 | Schkolne et al. |
| 2004/0245208 | A1 | 12/2004 | Dennison |
| 2005/0001060 | A1 | 1/2005 | Robinson |
| 2005/0056613 | A1 | 3/2005 | King |
| 2005/0082249 | A1 | 4/2005 | King |
| 2005/0127201 | A1 | 6/2005 | Matsumoto |
| 2005/0145723 | A1 | 7/2005 | Blette et al. |
| 2005/0145724 | A1 | 7/2005 | Blette et al. |
| 2005/0161525 | A1 | 7/2005 | Johansson |
| 2005/0178854 | A1 | 8/2005 | Dodd |
| 2005/0189445 | A1 | 9/2005 | Hartle et al. |
| 2005/0215284 | A1 | 9/2005 | Su |
| 2005/0218246 | A1 | 10/2005 | Chatron |
| 2005/0220943 | A1 | 10/2005 | Abrams et al. |
| 2005/0248148 | A1 | 11/2005 | Schenck et al. |
| 2005/0252993 | A1 | 11/2005 | Rogers |
| 2005/0252994 | A1 | 11/2005 | Rogers |
| 2005/0268949 | A1 | 12/2005 | Rosa |
| 2005/0284963 | A1 | 12/2005 | Reedy |
| 2006/0000927 | A1 | 1/2006 | Ruda |
| 2006/0007123 | A1 | 1/2006 | Wilson et al. |
| 2006/0048803 | A1 | 3/2006 | Jessup et al. |
| 2006/0081060 | A1 | 4/2006 | Forster |
| 2006/0108449 | A1 | 5/2006 | Sodemann |
| 2006/0113409 | A1 | 6/2006 | Camilleri et al. |
| 2006/0118661 | A1 | 6/2006 | Hartle |
| 2006/0131151 | A1 | 6/2006 | Marchand |
| 2006/0171771 | A1 | 8/2006 | Kruse |
| 2006/0192377 | A1 | 8/2006 | Bauer et al. |
| 2006/0196891 | A1 | 9/2006 | Gerson et al. |
| 2007/0029788 | A1 | 2/2007 | Adler |
| 2007/0055883 | A1 | 3/2007 | Kruse |
| 2007/0131795 | A1 | 6/2007 | Abbate et al. |
| 2007/0158349 | A1 | 7/2007 | Schmon et al. |
| 2007/0205305 | A1 | 9/2007 | Vagedes |
| 2007/0221754 | A1 | 9/2007 | Gehrung |
| 2007/0228190 | A1 | 10/2007 | Tanner |
| 2007/0252378 | A1 | 11/2007 | Chambers |
| 2007/0262169 | A1 | 11/2007 | Wang |
| 2007/0262172 | A1 | 11/2007 | Huffman |
| 2008/0011879 | A1 | 1/2008 | Gerson et al. |
| 2008/0019789 | A1 | 1/2008 | Dunaway et al. |
| 2008/0029619 | A1 | 2/2008 | Gohring et al. |
| 2008/0128533 | A1 | 6/2008 | Gehrung |
| 2008/0179763 | A1 | 7/2008 | Schmon et al. |
| 2008/0251607 | A1 | 10/2008 | Krayer et al. |
| 2008/0251977 | A1 | 10/2008 | Naruse et al. |
| 2008/0264892 | A1 | 10/2008 | Nozawa |
| 2008/0272213 | A1 | 11/2008 | Ting |
| 2008/0296410 | A1 | 12/2008 | Carey et al. |
| 2009/0014557 | A1 | 1/2009 | Schmon et al. |
| 2009/0026288 | A1 | 1/2009 | Shih |
| 2009/0026290 | A1 | 1/2009 | Fox |
| 2009/0045623 | A1 | 2/2009 | Schmon |
| 2009/0072050 | A1 | 3/2009 | Ruda |
| 2009/0078789 | A1 | 3/2009 | Kruse |
| 2009/0078790 | A1 | 3/2009 | Camilleri et al. |
| 2009/0143745 | A1 | 6/2009 | Langan et al. |
| 2009/0152382 | A1 | 6/2009 | Charpie |
| 2009/0179081 | A1 | 7/2009 | Charpie |
| 2009/0183516 | A1 | 7/2009 | Appler et al. |
| 2009/0235864 | A1 | 9/2009 | Khoury et al. |
| 2009/0266915 | A1 | 10/2009 | Fedorov |
| 2010/0021646 | A1 | 1/2010 | Nolte et al. |
| 2010/0059533 | A1 | 3/2010 | Unger et al. |
| 2010/0084493 | A1 | 4/2010 | Troudt |
| 2010/0108783 | A1 | 5/2010 | Joseph et al. |
| 2010/0126541 | A1 | 5/2010 | Schmon |
| 2010/0163649 | A1 | 7/2010 | Bass et al. |
| 2010/0206963 | A1 | 8/2010 | Huang |
| 2010/0270390 | A1 | 10/2010 | Reitz |
| 2010/0270400 | A1 | 10/2010 | Evar et al. |
| 2011/0024524 | A1 | 2/2011 | Fox |
| 2011/0024624 | A1 | 2/2011 | Fox |
| 2011/0125607 | A1 | 5/2011 | Wilen |
| 2011/0121103 | A1 | 6/2011 | Carleton et al. |
| 2011/0127767 | A1 | 6/2011 | Wicks et al. |
| 2011/0168811 | A1 | 7/2011 | Fox et al. |
| 2011/0174901 | A1 | 7/2011 | Dettlaff et al. |
| 2012/0012671 | A1 | 1/2012 | Brose et al. |
| 2012/0097762 | A1 | 4/2012 | Gehrung et al. |
| 2012/0132550 | A1 | 5/2012 | Gerson et al. |
| 2012/0160935 | A1 | 6/2012 | Krayer et al. |
| 2012/0187220 | A1 | 7/2012 | Micheli et al. |
| 2013/0056556 | A1 | 3/2013 | Schmon et al. |
| 2013/0074864 | A1 | 3/2013 | Nuzzo et al. |
| 2013/0092760 | A1 | 4/2013 | Joseph |
| 2013/0266734 | A1 | 10/2013 | Nolte et al. |
| 2013/0320110 | A1 | 12/2013 | Brose et al. |
| 2013/0327850 | A1 | 12/2013 | Joseph |
| 2014/0034757 | A1 | 2/2014 | Kaneko |
| 2014/0048627 | A1 | 2/2014 | Schmon et al. |
| 2014/0059905 | A1 | 3/2014 | Raming |
| 2014/0145003 | A1 | 5/2014 | Schmon et al. |
| 2014/0263686 | A1 | 9/2014 | Hedger |
| 2014/0305962 | A1 | 10/2014 | Tschan |
| 2014/0339322 | A1 | 11/2014 | Freers |
| 2014/0346257 | A1 | 11/2014 | Reetz, III et al. |
| 2015/0108254 | A1 | 4/2015 | Commette |
| 2015/0165463 | A1 | 6/2015 | Gehrung |
| 2015/0231655 | A1 | 8/2015 | Adams et al. |
| 2016/0030960 | A1 | 2/2016 | Gehrung |
| 2017/0252771 | A1 | 9/2017 | Young, II |
| 2017/0304852 | A1 | 10/2017 | Bierie |
| 2018/0050355 | A1 | 2/2018 | Delsard |
| 2018/0050356 | A1 | 2/2018 | Gehrung et al. |
| 2018/0050361 | A1 | 2/2018 | Gehrung et al. |
| 2018/0050362 | A1 | 2/2018 | Gehrung et al. |
| 2018/0133727 | A1 | 5/2018 | Schmon et al. |
| 2018/0200740 | A1 | 7/2018 | Rossbach et al. |
| 2020/0038889 | A1 | 2/2020 | Volk et al. |
| 2020/0038892 | A1 | 2/2020 | Volk et al. |
| 2021/0379612 | A1 | 12/2021 | Volk |
| 2022/0048054 | A1 | 2/2022 | Maier |
| 2023/0107860 | A1 | 4/2023 | Maier |
| 2023/0149955 | A1 | 5/2023 | Maier |

FOREIGN PATENT DOCUMENTS

| | | | |
|---|---|---|---|
| AT | 250467 | | 10/2003 |
| AT | 322645 | | 4/2006 |
| AT | 383910 | | 2/2008 |
| AT | 461752 | | 4/2010 |
| AT | 461753 | | 4/2010 |
| AT | 475488 | | 8/2010 |
| AU | 637187 | | 5/1993 |
| AU | 2002352235 | | 9/2003 |
| AU | 2004315547 | | 8/2005 |
| AU | 2005205899 | | 8/2005 |
| AU | 2011257605 | | 11/2012 |
| AU | 2011361295 | | 5/2013 |
| CA | 521511 | | 2/1956 |
| CA | 2126957 | | 1/1995 |
| CA | 2277096 | | 7/1998 |
| CA | 2445183 | | 10/2002 |
| CA | 2552390 | | 8/2005 |
| CA | 2555607 | | 8/2005 |
| CA | 2690112 | | 5/2009 |
| CA | 2797990 | | 12/2011 |
| CA | 2812684 | | 9/2012 |
| CA | 102917803 | | 2/2013 |
| CA | 2850401 | A1 | 5/2013 |
| CH | 200754 | A | 10/1938 |
| CH | 203 668 | | 6/1939 |
| CH | 523 098 | A | 5/1972 |
| CH | 542104 | A | 9/1973 |

(56) References Cited

FOREIGN PATENT DOCUMENTS

| | | | |
|---|---|---|---|
| CH | 676208 | | 12/1990 |
| CN | 2136077 | Y | 6/1993 |
| CN | 1738310 | A | 2/2006 |
| CN | 1899704 | A | 1/2007 |
| CN | 1902002 | | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101125316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 202667052 | U | 1/2013 |
| CN | 103521378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | | 10/1930 |
| DE | 611325 | C | 3/1935 |
| DE | 1425890 | | 11/1968 |
| DE | 2559036 | | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | 94 16 015.5 | U1 | 11/1994 |
| DE | 4321940 | | 1/1995 |
| DE | 692 11 891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10059406 | | 6/2002 |
| DE | 10135104 | | 9/2002 |
| DE | 10135104 | C1 | 9/2002 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |
| DE | 10 2004 007 733 | | 9/2005 |
| DE | 10 2004 021 298 | | 11/2005 |
| DE | 69928944 | T2 | 9/2006 |
| DE | 69535077 | T2 | 11/2006 |
| DE | 202007001031 | | 3/2007 |
| DE | 601 20 633 | T2 | 5/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2009 020 194 | A1 | 11/2010 |
| DE | 20 2010 012 449 | U1 | 12/2010 |
| DE | 202010012449 | | 12/2010 |
| DE | 10 2009 032 399 | A1 | 1/2011 |
| DE | 102009053449 | | 2/2011 |
| DE | 102010060086 | | 4/2012 |
| DE | 10 2010 056 263 | A1 | 6/2012 |
| DE | 102011106060 | | 1/2013 |
| DE | 102011118120 | | 5/2013 |
| DE | 10 2011 120 717 | A1 | 6/2013 |
| DE | 112007001824 | B4 | 7/2013 |
| DE | 10 2012 013 464 | A1 | 11/2013 |
| DE | 10 2015 114202 | A1 | 1/2017 |
| DE | 10 2018 118737 | A1 | 2/2020 |
| DE | 102021124139 | A1 | 3/2023 |
| DE | 102021124140 | A1 | 3/2023 |
| DE | 102021124141 | A1 | 3/2023 |
| EM | 002066910-0001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 5/1996 |
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1247586 | | 10/2002 |
| EP | 1277519 | | 1/2003 |
| EP | 1294490 | | 3/2003 |
| EP | 1299194 | | 4/2003 |

(56) References Cited

FOREIGN PATENT DOCUMENTS

| | | | |
|---|---|---|---|
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 1997561 | A2 | 12/2008 |
| EP | 2017010 | A2 | 1/2009 |
| EP | 2027931 | | 2/2009 |
| EP | 1 270 081 | B1 | 3/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 1/2015 |
| EP | 3184177 | A1 | 6/2017 |
| EP | 2828000 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | U | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |
| JP | 2005000735 | A | 1/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| KR | 20140064644 | A | 5/2014 |
| RU | 2523816 | C1 | 1/2014 |
| TW | 491092 | | 6/2002 |
| TW | 510253 | U | 11/2002 |
| TW | I220392 | | 8/2004 |
| TW | I303587 | | 12/2008 |
| TW | I309584 | | 5/2009 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |
| WO | 01/012337 | | 2/2001 |
| WO | 2001/12337 | | 2/2001 |
| WO | 0166261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012/013574 | A1 | 2/2012 |
| WO | 2012/052255 | A1 | 4/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |

(56) References Cited

FOREIGN PATENT DOCUMENTS

| | | | |
|---|---|---|---|
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Final Office Action in U.S. Appl. No. 14/113,649 dated Jun. 22, 2017.
Response filed in U.S. Appl. No. 15/143,698 dated Jul. 3, 2017.
Response filed Dec. 21, 2015 to Office Action dated Jul. 20, 2015 for U.S. Appl. No. 14/113,649.
International Search Report dated Apr. 12, 2019 and Written Opinion for PCT/DE18/100679, filed Aug. 1, 2018 (21 pages).
International Search Report dated Jul. 14, 2016 for International Application No. PCT/EP2016/000809, filed May 17, 2016.
Written Opinion for International Application No. PCT/EP2016/000809, filed May 17, 2016.
Final Office Action dated Aug. 12, 2019, from U.S. Appl. No. 14/815,210.
Final Office Action dated Nov. 23, 2021 for U.S. Appl. No. 15/679,533.
European Search Report dated Feb. 21, 2020 for Application No. 19183382.1.
Response dated Feb. 19, 2020 for U.S. Appl. No. 15/575,549.
Office Action dated Jan. 25, 2019 for U.S. Appl. No. 15/379,972.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
Office Action dated Feb. 19, 2016 for U.S. Appl. No. 14/113,649.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
Response restriction requirement filed May 23, 2016 for Design U.S. Appl. No. 29/516,082.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
Final Office Action dated Sep. 12, 2018 in U.S. Appl. No. 14/815,210.
European Search Report dated Jan. 24, 2018 for Application No. 17186905.
Written Opinion dated Sep. 8, 2016 for International Application No. PCT/EP2016/061057 filed May 18, 2016.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Response filed May 5, 2021 for U.S. Appl. No. 16/524,740.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps:/ /web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Final Office Action dated Jun. 1, 2021 for U.S. Appl. No. 16/524,740.
Final Rejection dated Jul. 22, 2021 for U.S. Appl. No. 16/524,838.
German Search Report dated Apr. 21, 2017 for application No. 10 2016 009 957.7.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Office Action dated Nov. 24, 2021 for U.S. Appl. No. 16/524,740.
Notice of Allowance dated Jul. 26, 2021, for U.S. Appl. No. 15/575,549.
Response filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Search Report dated Jan. 29, 2022, for Chinese Patent Appl. No. 201910704447X, with translation.
Japanese Office Action dated Sep. 25, 2019 for Japanese Publication No. 2015-149405, 4 pages.
Second Office Action, dated Aug. 26, 2022, for Chinese Patent Application No. 2019107032612.
Third Office Action dated Feb. 15, 2023 for Chinese Patent Application No. 20191070444.X.
Chinese Search Report for Application No. 2017107135569 dated Aug. 24, 2020 and English translation.
Notice of Allowance dated Sep. 17, 2020 for U.S. Appl. No. 15/679,461.
European Search Report dated May 8, 2017 for Application No. EP16203544.
"Spray Guns/SATA.com", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.

(56) References Cited

OTHER PUBLICATIONS

Amendments submitted to European Patent Office on Dec. 3, 2017 for Application No. EP16203544 (with English translation of chart on p. 3).
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
Decision on Rejection dated Feb. 10, 2023 for Chinese Patent Application No. 2018800961965.
Search Report dated Jan. 30, 2023 for Chinese Patent Application No. 2018800961965.
Office Action dated Dec. 9, 2021 for U.S. Appl. No. 16/524,838.
Response to Restriction Requirement filed Oct. 29, 2019 for U.S. Appl. No. 15/575,549.
International Search Report dated Nov. 13, 2019 for PCT/EP2019/074000, filed Sep. 9, 2019.
Written Opinion or PCT/EP2019/074000, filed Sep. 9, 2019.
Restriction Requirement dated Mar. 18, 2019, for U.S. Appl. No. 29/596,869.
Office Action dated Mar. 15, 2019, for U.S. Appl. No. 14/815,210.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
Office Action dated Feb. 19, 2021 for U.S. Appl. No. 15/575,549.
International Preliminary Report on Patentability with Written Opinion dated Mar. 9, 2021 for PCT/EP2019/074000 filed Sep. 9, 2019.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
1 Final Office Action dated Sep. 4, 2020 for U.S. Appl. No. 15/679,533 .
Chinese Notification of the Third Office Action dated Feb. 14, 2023 for Chinese Patent Application No. 2019107032612, 15 pages.
European Office Action dated Mar. 21, 2023 for European Patent Application No. 19 183 382.1 (12 pages).
International Search Report dated Aug. 31, 2016 for PCT/EP2016/061057 filed May 18, 2016.
Written Opinion for PCT/EP2016/061057 filed May 18, 2016.
Office Action dated Mar. 30, 2020, for U.S. Appl. No. 15/679,533.
Office Action for U.S. Appl. No. 14/815,210 , dated Apr. 3, 2018.
Response for U.S. Appl. No. 14/113,649, filed Mar. 3, 2018.
German Search Report dated Apr. 10, 2018 for Application No. 10 2017 118 599.2.
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
Response to Final Office Action, filed Jan. 4, 2021, for U.S. Appl. No. 15/679,533 (18 pages).
Response to Restriction Requirement, filed Jan. 25, 2021, for U.S. Appl. No. 16/524,740 (9 pages).
Office Action, dated Jan. 9, 2019, for U.S. Appl. No. 15/679,482.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 on Feb. 25, 2014 with English translation.
For U.S. Appl. No. 16/524,740: Interview Summary and Advisory Action dated Aug. 30, 2021.
Response to Office Action dated Jun. 25, 2018 for U.S. Appl. No. 14/815,210.
Response to Final Office Action dated Aug. 22, 2018 for U.S. Appl. No. 14/113,649.
Final Office Action dated Dec. 7, 2017 for U.S. Appl. No. 14/815,210.
International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
Office Action dated Dec. 2, 2022 for U.S. Appl. No. 16/524,838.
Response to Restriction Requirement filed in U.S. Appl. No. 14/815,210 dated Jun. 19, 2017 .
Response to Final Office Action and RCE dated Nov. 29, 2016 in U.S. Appl. No. 14/113,649.
Final Office Action dated May 2, 2022 for U.S. Appl. No. 16/524,740.
International Search Report and Written Opinion for PCT/EP2021/53940, filed Feb. 18, 2021 (282).
Office Action dated Feb. 5, 2021 for U.S. Appl. No. 16/524,740.
Office Action dated Feb. 5, 2021 for U.S. Appl. No. 16/524,838.
Examination Report from the European Patent Office dated Nov. 23, 2021 for European Patent Application No. 19183380.5.
European Search Report dated Feb. 4, 2022 for Application No. 21191428.8.
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.

(56) References Cited

OTHER PUBLICATIONS

International Search Report dated Apr. 12, 2019 for PCT/DE2018/100679 filed Aug. 1, 2018.
Written Opinion for PCT/DE2018/100679 filed Aug. 1, 2018.
For U.S. Appl. No. 16/524,838: Response and Request for Continued Exam filed Oct. 22, 2021.
German Search Report dated May 7, 2019 for Application No. 10 2018 122 004.9.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], <http://www.herkules.us/pdfs/L00761-Hercules-Gun_Washers-4-page-brochure.pdf> (.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-518769.
Australian Examination Report dated Nov. 11, 2014 for Australian patent Application No. 2011257605.
Japanese Notice of Allowance mailed Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/519,198.
Final Office Action dated Jul. 20, 2015 for U.S. Appl. No. 14/113,649.
Response to Final Office Action, dated Nov. 11, 2019, for U.S. Appl. No. 14/815,210 20 pages.
Office Action, dated Nov. 20, 2019, for U.S. Appl. No. 15/575,549 12 pages.
Office Action, dated Dec. 9, 2019, for U.S. Appl. No. 14/815,210 6 pages.
For Chinese Patent Application No. 2019800593031 First Office Action dated Apr. 25, 2022 (Eng. translation) Chinese Search Report dated Apr. 19, 2022.
Final Office Action dated Feb. 27, 2020 for U.S. Appl. No. 15/575,549 .
Office Action dated Jun. 30, 2017 for U.S. Appl. No. 14/815,210.
European Search Report, dated Jan. 20, 2020, for European Application No. 19183380.
Office Action dated Aug. 7, 2015 for U.S. Appl. No. 13/991,285.
Office Action dated Mar. 29, 2023 for U.S. Appl. No. 17/264,372.
Examination Report from the European Patent Office dated Nov. 8, 2021 for European Patent Application No. 19183382.1.
Office Action dated Feb. 24, 2023 for U.S. Appl. No. 16/524,740.
German Search Report for Application No. 10 2016 009 957.7 dated Apr. 21, 2017.
International Search Report and Written Opinion for PCT/EP2021/54059, filed Feb. 18, 2021.
Office Action, dated Jan. 15, 2019, for U.S. Appl. No. 15/679,533.
Office Action, dated Jan. 15, 2019, for U.S. Appl. No. 15/679,461.
Notice of Allowance dated Jan. 27, 2016 for Design U.S. Appl. No. 29/510,723.
International Preliminary Report on Patentability for PCT/EP2015/001728 filed Aug. 25, 2015.
Final Office Action dated Mar. 16, 2017 from U.S. Appl. No. 13/698,417, 9 pages.
Office Action from U.S. Appl. No. 15/143,698 dated Jan. 5, 2017.
German Search Report for German Application No. 10 2015 016 474.0 dated Aug. 9, 2016, 14 pages.
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
International Preliminary Report on Patentability, dated Mar. 9, 2021, with Written Opinion for PCT/EP2019/074000, filed Sep. 9, 2019 (English translation) (7 pages).
Search Report dated Jan. 7, 2022, for Chinese Patent Appl. No. 2018800961965, with translation.
Office Action dated Apr. 26, 2022 for U.S. Appl. No. 15/679,533.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482.
Final Office Action dated May 12, 2022, for U.S. Appl. No. 16/524,838.
Final Office Action dated Sep. 23, 2020, for U.S. Appl. No. 15/575,549.
For Chinese Application No. 201910704447.X: Search Report, dated Aug. 25, 2022 Second Office Action, dated Sep. 1, 2022.
German Search Report dated May 26, 2021, for DE 10 2020 123 769.3, with machine translation.
Response filed May 28, 2019 for U.S. Appl. No. 15/379,972.
Final Office Action for U.S. Appl. No. 15/679,461 dated Jun. 11, 2019.
Final Office Action for U.S. Appl. No. 15/679,533 dated Jul. 12, 2019.
May 22, 2018 Final Office Action for U.S. Appl. No. 14/113,649.
Jun. 25, 2018 Response to Office Action for U.S. Appl. No. 14/815,210.

(56) References Cited

OTHER PUBLICATIONS

Office Action dated Aug. 12, 2021 for U.S. Appl. No. 15/679,533.
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
Restriction/Species requirement dated Dec. 7, 2020 for U.S. Appl. No. 16/524,838.
German Search Report dated Mar. 15, 2016 for Application No. 20 2015 003 664.3, 8 pages.
Chinese Search Report dated Feb. 21, 2019 for Application No. 2016800293781, 3 pages.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of copy of page 28 from current 3Mtm brochure showing Tip/Nozzle/Air Cap Selection Guide with nozzle sizes from 0.5 mm to 3.0 mm., (Exhibit 1027 in IPR 2013-0111).
Copy of decision by EPO regarding opposition proceedings to revoke patent No. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised 1991-03-01 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al., A conceptual design . . . , Mechatrronics 17 (2007) p. 1-13 (Exhibit 2015 in IPR 2013-0111).
On line ad from Amazon.com printed Oct. 14, 2013 (Exhibit 2017 in IPR 2013-0111).
Rone et al., MEMS-Baed Microdroplet Generation with Integrated Sensing, COMSOL, 2011 (Exhibit 2018 in IPR 2013-0111).
For Chinese Application No. 2018800961965: Search Report, dated Aug. 1, 2022 (English translation) X Second Office Action, dated Aug. 12, 2022 (English translation).
Reply filed Oct. 11, 2019 for U.S. Appl. No. 15/679,461.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
Japanese Office Action dated Jun. 28, 2023 for Japanese Patent Application No. 2021-537499 with translation.
International Preliminary Report on Patentability dated Jan. 31, 2023 with Written Opinion for International Application No. PCT/EP2021/071252 filed Jul. 29, 2021.
Notice of Allowance dated Aug. 25, 2023 for U.S. Appl. No. 16/524,838.
Notice of Allowance dated Jun. 27, 2023 for U.S. Appl. No. 16/524,740.
Ror German Patent Application No. 19 183 380.5: Office Action dated Nov. 4, 2022 Office Action dated May 19, 2023.
European Office Action dated Mar. 15, 2024 for European Patent Application No. 21 706 892.3.
European Office Action dated Mar. 7, 2024 for European Patent Application No. 21 706 572.1.
European Office Action dated Mar. 6, 2024 for European Patent Application No. 21 191 428.8.
European Office Action dated Mar. 14, 2024 for European Patent Application No. 21 706 923.6.
Japanese Office Action dated Mar. 6, 2024 for Japanese Patent Application No. 2021-537499 (11 pages).
1 Office Action dated Apr. 25, 2024 for U.S. Appl. No. 17/274,710.

* cited by examiner

SEALING ELEMENT FOR SEALING A TRANSITION BETWEEN A SPRAY GUN BODY AND AN ATTACHMENT OF A SPRAY GUN, ATTACHMENT, IN PARTICULAR A PAINT NOZZLE ARRANGEMENT FOR A SPRAY GUN AND A SPRAY GUN, IN PARTICULAR A PAINT SPRAY GUN

FIELD OF THE DISCLOSURE

The disclosure relates to a sealing element for sealing a transition between a spray gun body, in particular a paint spray gun body, and an attachment of a spray gun; an attachment, in particular a paint nozzle arrangement for a spray gun, in particular a paint spray gun; and a spray gun, in particular a paint spray gun.

BACKGROUND

According to the prior art, a spray gun, in particular a paint spray gun, in particular a compressed air-atomizing paint spray gun, has on its head a paint nozzle also referred to as a material nozzle, which is screwed into the gun body. At its front end, the paint nozzle often has a hollow cylindrical cone, from whose front opening the material being sprayed emerges during operation of the spray gun. However, the nozzle can also be designed to be conical at its front area. The gun head generally has an external thread via which an air nozzle ring with an air cap arranged therein is screwed onto the gun head. The air cap has a central opening whose diameter is greater than the outside diameter the paint nozzle cone or the outside diameter of the front end of a conical paint nozzle. The central opening of the air cap and the cone or the front end of the paint nozzle together form an annular gap. The so-called atomizer air emerges from this annular gap, generating a partial vacuum on the front surface of the paint nozzle in the nozzle arrangement just described so that the material being sprayed is sucked out of the paint nozzle. The material being atomized is fed to the atomizer air and torn into filaments and strips. Because of their hydrodynamic instability, the interaction between the rapidly flowing compressed air and the surrounding air and because of aerodynamic disturbances, these filaments and strips disintegrate into droplets that are blown away from the nozzle by the atomizing air.

The air cap also often has two horns, which are diametrically opposite each other and extend in the outflow direction beyond said annular gap and the paint outlet opening. Two supply holes, i.e. horn air supply channels, run from the back of the air cap to the horn air holes in the horns. Generally, each horn has at least one horn air hole, but preferably each horn has at least two horn air holes from which the horn air exits. The horn air holes are generally oriented so that they point in the direction of the longitudinal axis of the nozzle, beyond the annular gap in the output direction so that the so-called horn air emerging from the horn air holes can influence the air that has already emerged from the annular gap or the already at least partially formed paint jet or paint mist. The paint jet or also the spray jet with an originally circular cross section (round jet) is thereby compressed on its sides facing the horns and lengthened in a direction perpendicular thereto. A so-called broad jet is thus formed, which enables a greater surface painting speed. In addition to deforming the spray jet, the horn air is intended to further atomize the spray jet.

The aforementioned paint nozzle often has a paint nozzle seal. Such a paint nozzle seal is disclosed, for example, in DE 10 2018 118 737 A1. The paint nozzle seal 44 shown therein, in particular in FIGS. 11 and 12, is forced against a counter-sealing surface 84, which is shown in FIG. 6, when the nozzle 24 is screwed in, and seals the material-guiding area of the spray gun, in particular the transition area between the paint channel in the body and the hollow section of the paint nozzle 40 for passage of the material being sprayed, relative to the air-guiding area of the spray gun.

Such a paint nozzle arrangement has proven itself over many years. However, there is potential for improvement with respect to tightness and manufacturability. High tightness is desirable, since with deficient sealing, for example between the body and the paint nozzle, the material being sprayed could leave the transition between the body and the paint nozzle in an undesirable manner and reach the air-guiding area of the spray gun. This could lead to contamination of the air channels and air outlets of the spray gun and to an adverse effect on spray quality.

SUMMARY

One aspect of the disclosure is therefore to provide a sealing element by means of which better sealing of a transition between a body of a spray and an attachment of a spray gun can be ensured and which is easier to manufacture.

Another aspect of the disclosure is to provide an attachment, in particular a paint nozzle arrangement, for a spray gun, in particular a paint spray gun, and a spray gun, in particular a paint spray gun in which a transition between an attachment and a body of a spray gun is better sealed.

The first aspect is achieved by a sealing element for sealing a transition between the body of a spray gun, in particular paint spray gun, and an attachment of a spray gun, in particular a paint nozzle, in which the sealing element is configured so that, when the attachment is arranged in the body, it forms an axially acting sealing surface and a radially acting sealing surface with the body and/or the attachment.

The attachment is preferably a paint nozzle or a paint nozzle arrangement, but can also be another attachment, like a fan control, a material amount regulator, an air micrometer, a compressed air connection or a material supply, like a paint container or a hose.

A paint nozzle arrangement can be understood to mean, for example, an arrangement of a, in particular one-piece, paint nozzle and at least one additional component, like a throttle, a disk, a sealing element, in particular a sealing element described in more detail below, and/or another component.

The body preferably has a grip area and an upper body with a head area and a suspension hook. The body is preferably designed in one piece, but can also be made up of several parts.

In the present case, an axially acting sealing surface is understood to mean that a surface of the sealing element rests sealingly against a counter-sealing surface, in which case the surface of the sealing element and the counter-sealing surface, in the present case a counter-sealing surface on the body of a spray gun, rest against each other, in particular are pressed against each other, in the axial direction, i.e. along a longitudinal axis of the sealing element.

In the present case, a radially acting sealing surface is understood to mean that a surface of the sealing element rests sealingly against a counter-sealing surface, in which case a surface on the inside and/or outside periphery of the sealing element and a counter-sealing surface on the inside and/or outside periphery of a component, in the present case on an inside and/or outside periphery in or on the body of a spray gun, rest against each other, in particular are pressed against each other, in the radial direction.

Due to the axially acting and radially acting sealing surface, the sealing element according to the disclosure provides a significantly improved sealing effect relative to sealing elements of the prior art. The material being sprayed would have to overcome two barriers in the form of sealing surfaces instead of only one, in order to leave the transition between the spray nozzle and the body of the spray gun in an undesirable manner and enter the air-guiding area of the spray gun. In addition, the material would also have to execute a change in direction, for example, from the radial direction to the axial direction. It is particularly advantageous that the axially acting sealing surface and the radially acting sealing surface are formed by the same sealing element. It is particularly advantageous that the axially acting sealing surface and the radially acting sealing surface are formed by the same sealing element. This means that a sealing element for radial sealing and an additional sealing element for axial sealing are not necessary, but that a single sealing element satisfies these objectives. The radial sealing surface and the axial sealing surface in the sealing element according to the disclosure can even be formed by the same part of the sealing element, for example, by a rear section of the sealing element configured as a hollow truncated cone, as described in more detail below, which simplifies manufacture of the sealing element. If necessary, of course, one or several additional sealing means can still be provided.

One advantage of expanding the sealing element to form a radial sealing surface, compared to the use of a sealing element introduced by force-fitting, lies in the fact that the expanding sealing element can be installed more easily and must satisfy less strict tolerance requirements than a sealing element introduced by force-fitting.

The second aspect is achieved by an attachment, in particular a paint nozzle arrangement for a spray gun, in particular a paint spray gun, in which there is at least one sealing element, as described in more detail above and below.

This attachment can also preferably be a paint nozzle or paint nozzle arrangement, but can also be another attachment, like a fan control, a material amount regulator, an air micrometer, a compressed air connection or a material supply, like a paint container or hose.

A paint nozzle arrangement can also be understood here to mean an arrangement of a, in particular one-piece, paint nozzle and at least one additional component, like a throttle, a disk, a sealing element, in particular a sealing element described in more detail below and/or another component.

The second aspect is also achieved by a spray gun, in particular paint spray gun, in which there is at least one sealing element described above and further below and/or an attachment described above and further below.

Comments concerning the sealing element according to the disclosure apply accordingly to the paint nozzle arrangement according to the disclosure and to the spray gun according to the disclosure.

Advantageous embodiments are also disclosed herein.

The sealing element is preferably configured so that when the attachment is arranged in the body, in particular when fastened therein, it expands at at least one end and thereby forms the radially acting sealing surface with the body and/or the attachment.

The attachment, in particular the paint nozzle or the paint nozzle arrangement, can be screwed into the body, for example. The sealing element can begin to expand from the beginning of the arrangement process, in particular at the beginning of screwing the attachment into the body, but preferably only expands toward the end of the arrangement process, in particular toward the end of screwing-in, i.e., when the attachment is tightened in the body. Expansion in the present case is understood to mean enlargement of a periphery and/or a diameter of the sealing element, preferably a part of the sealing element, with particular preference an end of the sealing element, in particular by material expansion. The sealing element preferably expands in the tightened state, preferably reversibly. In the untightened state, when the attachment is not arranged in the body of the spray gun, the sealing element does not expand and has a first outside diameter or outside periphery. If the attachment is fastened in the gun body, expansion occurs and the sealing element is present in its tightened state. In this state, at least part of the sealing element, in particular one end of the sealing element, has a second outside diameter or outside periphery that is greater than the first outside diameter or outside periphery. The second outside diameter or outside periphery is preferably the maximum outside diameter or outside periphery of the sealing element, i.e., the sealing element in no instance has a greater outside diameter or outside periphery than in the expanded state. Upon release and/or loosening, the sealing element ideally recovers its unexpanded state and the formerly expanded part of the sealing element again has the first outside diameter or outside periphery. In reality, a slight residual deformation of the expanded part can occur, i.e., the outside diameter or outside periphery of the previously expanded part of the sealing element may be somewhat larger than the first outside diameter or outside periphery before the first tightening of the sealing element, but will be much smaller than the second outside diameter or outside periphery of the expanded part of the sealing element.

The sealing element preferably has a front section with at least one device for arrangement of the sealing element on an attachment, in particular a snap-in tab, in particular a circumferential snap-in tab, and a rear section, the rear section being designed as a truncated hollow cone.

The sealing element can be designed essentially as a hollow cylinder, i.e., in the form of a sleeve. In the present case, the front section is understood to mean the side of the sealing element facing the paint nozzle, in particular the paint outlet opening of the paint nozzle. The sealing element has the above-mentioned snap-in tab or at least a preferably circumferential hook on this front section, preferably on its outer periphery, by means of which the sealing element can be arranged on the paint nozzle, preferably releasably. These snap-in tabs can engage an undercut on the inside periphery of the paint nozzle. The sealing element, however, can also have a preferably circumferential groove, with which a protrusion on the inside periphery of the paint nozzle can engage. Naturally, the paint nozzle can have the snap-in tab and the sealing element can have the undercut or the paint nozzle can have the groove and the sealing element the protrusion. Other types of connection are also conceivable, for example, a screw connection or also a permanent connection, such as an adhesive bond. However, a releasable connection is preferred in order to permit replacement of the sealing element when worn.

In the present case, the rear section is understood to mean the side of the sealing element facing away from the paint nozzle, in particular the paint outlet opening of the paint nozzle. This section is preferably designed as a truncated hollow cone, i.e., the section widens rearward. With particular preference, the rear section or the rear part of the rear section is the expanding part of the sealing element.

A substantially cylindrical section can be arranged between the front and rear section of the sealing element. This can have a preferably circumferential collar on its outer peripheral surface, which can function as a stopper for positioning the sealing element on the paint nozzle.

The sealing element preferably consists at least partially of a flexible material, in particular plastic or a plastic mixture, preferably HDPE. In particular, the part of the sealing element forming an axially acting sealing surface and a radially acting sealing surface should consist of a flexible material, in particular plastic or a plastic mixture, preferably HDPE, in order to ensure the functionality of the sealing element, in which case said part of the sealing element expands sufficiently. The sealing element is preferably made entirely of such a material.

The attachment according to the disclosure, which is preferably a paint nozzle arrangement, also preferably has at least a front end with a paint outlet opening, a rear end with a paint inlet opening and a substantially hollow cylindrical section in between, in which the sealing element at least in some areas has essentially the same inside diameter as the substantially hollow cylindrical section. A particularly undisturbed flow of the material being sprayed form the sealing element into the substantially hollow cylindrical section of the paint nozzle is thereby possible. With particular preference, the sealing element at least in some areas has essentially the same inside diameter as a paint channel located behind the sealing element in the body of the spray gun, which enables an unimpeded flow of the material being sprayed from the paint channel into the sealing element. Stages in which paint collects, dries up, and could adversely affect the material flow and material quality, in particular the material purity, can also thereby be avoided.

The spray gun according to the disclosure preferably also has at least one body, in which the body has at least one area for accommodating an attachment, in particular a paint nozzle and/or a paint nozzle arrangement, the area having at least one essentially cylindrical wall section, in particular a wall section having at least partially a thread, preferably an internal thread, with a shoulder arranged on one end of the wall section, in particular a circumferentially configured shoulder.

By means of the thread on the essentially cylindrical wall section in the body, the paint nozzle arrangement, which has a thread corresponding to this thread [on the essentially cylindrical wall section], and which can consist in particular of a paint nozzle and the sealing element according to the disclosure, can be screwed into the body of the spray gun. Since the outside diameter or outside periphery of the sealing element is at most as large as the inside diameter of the cylindrical wall section, but preferably somewhat smaller, the sealing element and the cylindrical wall section do not initially touch or at most slightly brush against each other. Toward the end of the screwing-in process, the rear end of the rear section of the sealing element touches the shoulder arranged on one end of the wall section, which is preferably configured circumferentially. If the paint nozzle arrangement is further screwed into the body, in particular tightened, the rear section is forced increasingly more strongly against the shoulder so that the axially acting sealing surface is formed between the sealing element and the body. Owing to the special configuration of this part of the sealing element, in particular the configuration as a truncated hollow cone, the part is widened, i.e., expands. The outside diameter or outside periphery of this part of the sealing element becomes larger until it is forced increasingly more strongly against the cylindrical wall section in the body, with which it was scarcely in contact at the beginning of the screwing-in process. The radially acting sealing surface is thus formed between the sealing element and the body. As already described above, the fact that both an axially acting sealing surface and a radially acting sealing surface are present reduces the risk that the material being sprayed from the paint channel in the body of the spray gun will flow between the body and the paint nozzle and into the air-guiding area of the spray gun.

As already mentioned, an inside diameter of the area for accommodating an attachment, in particular an inside diameter of the essentially cylindrical wall section, is with particular preference at least in some areas greater than or equal to an outside diameter of the sealing element. As a result, an easier arrangement is possible, in particular screwing-in the paint and nozzle arrangement with the sealing element into the area for accommodating an attachment, since very little or no friction resistance need be overcome between the sealing element and the cylindrical wall section of the receiving area. Furthermore, wear of the sealing element, which in the case of a larger outside diameter of the sealing element would result from friction of the sealing element on the cylindrical wall section, can also be avoided.

As already described above, the sealing element is preferably arranged between the body and the attachment and, when the attachment is arranged in the body, forms a radially acting sealing surface with the wall section and an axially acting sealing surface with the shoulder.

With particular preference, the spray gun has a stop for an attachment, which also defines the maximum expansion of a sealing element. The stop for an attachment means in particular a stop that forms a stop for insertion, in particular screwing, of the attachment into the body. For example, a surface of the attachment can encounter a stop in the gun body or a thread end forms the stop. When an ongoing arrangement process, for example, continued screwing-in of a paint nozzle arrangement into the body of a spray gun, entails an increasingly greater expansion of a sealing element, the maximum expansion of the sealing element can be defined via the stop for the attachment. If the attachment can no longer be further introduced, in particular screwed into the body, the sealing element in this case also cannot further expand.

In all cases the sealing element can also naturally be arranged in or on the gun body and the attachment pressed onto the sealing element in or on the gun body, thereby forming the axially acting sealing surface and the radially acting sealing surface.

BRIEF DESCRIPTION OF THE DRAWINGS

The disclosure is explained in more detail below, by way of example and with reference to six figures. In the figures.

DETAILED DESCRIPTION

Figure 1:
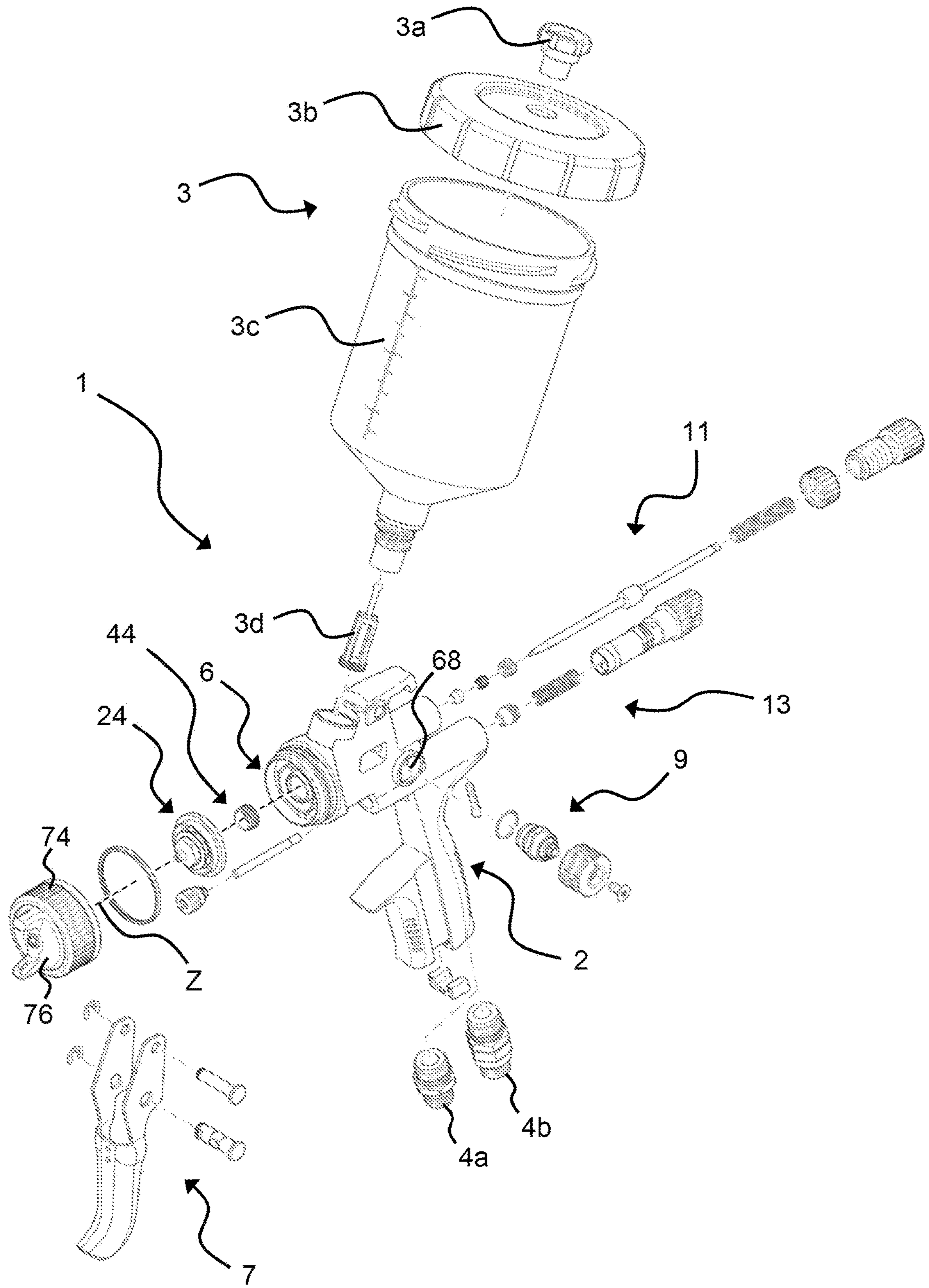
Fig. 1 (Prior Art)
FIG. 1 shows an exploded view of an embodiment of a spray gun according to the prior art.

FIG. 1 shows an exploded view of a spray gun 1 according to the prior art. The spray gun 1 can have a container 3 for receiving and dispensing the material being sprayed, in which the container includes a cover 3*b* with a valve plug 3*a*, a container body 3*c* and a plug-in screen 3*d*. The spray gun 1 can also have a material amount regulation device 11, an air micrometer 13, a round wide-jet regulation device 9, a trigger guard system 7 consisting of a trigger guard and fastening devices, and an air connection, which can be designed as a standard connection 4*a* or as a rotary joint connection 4*b*. A paint nozzle arrangement 24 can be arranged on the head area 6 of the body 2. The spray gun 1 also includes an air cap 76, which can be fastened, in particular screwed onto the head area 6 via an air nozzle ring 74. In the present case, the head area 6, the paint nozzle arrangement 24 and the air cap 76 with air nozzle ring 74 are arranged or can be arranged coaxially along an axis Z, which in the present case represents the aforementioned central or longitudinal axis of the head area 6 of the body 2, the central or longitudinal axis of the paint nozzle arrangement 24, the central or longitudinal axis of the upper part of the body 2 and the central or longitudinal axis of a receptacle opening for accommodating the material amount regulation device 11. The spray gun 1 also has a sealing element 44 configured as a paint nozzle seal according to the prior art, which is described in more detail below.

Figure 2:
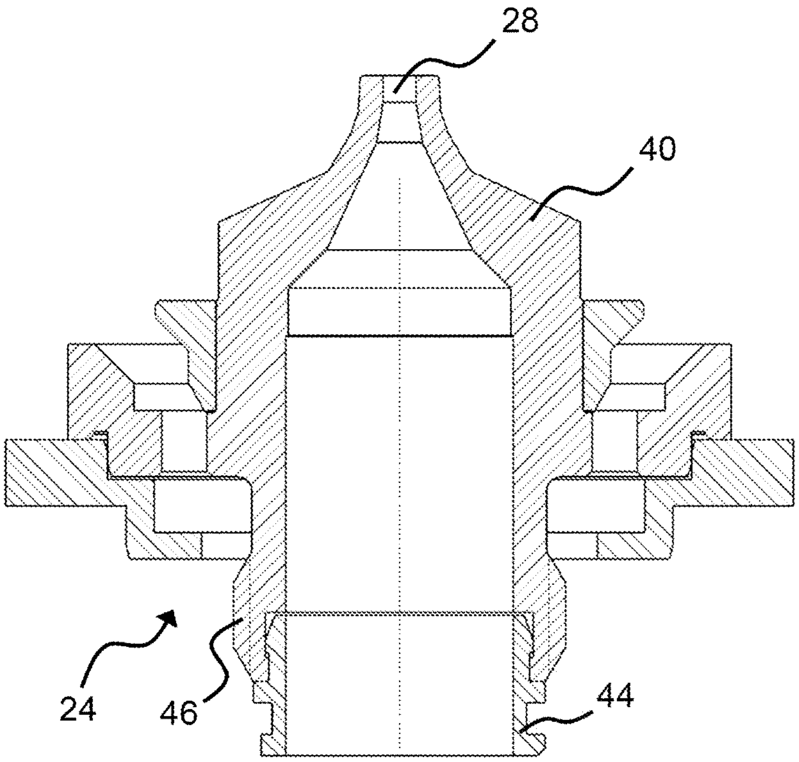
Fig. 2 (Prior Art)
FIG. 2 shows a sectional view of a paint nozzle arrangement according to the prior art.

FIG. 2 shows a sectional view of a paint nozzle arrangement 24 with a sealing element 44 according to the prior art. In the present case, the sealing element 44 is configured as a paint nozzle seal. The paint nozzle 40 has an external thread 46. The sealing element 44 is arranged on the rear end of the paint nozzle 40. It is designed to be essentially sleeve-like and has a circumferential collar at its rear end and in its middle area.

Figure 3:
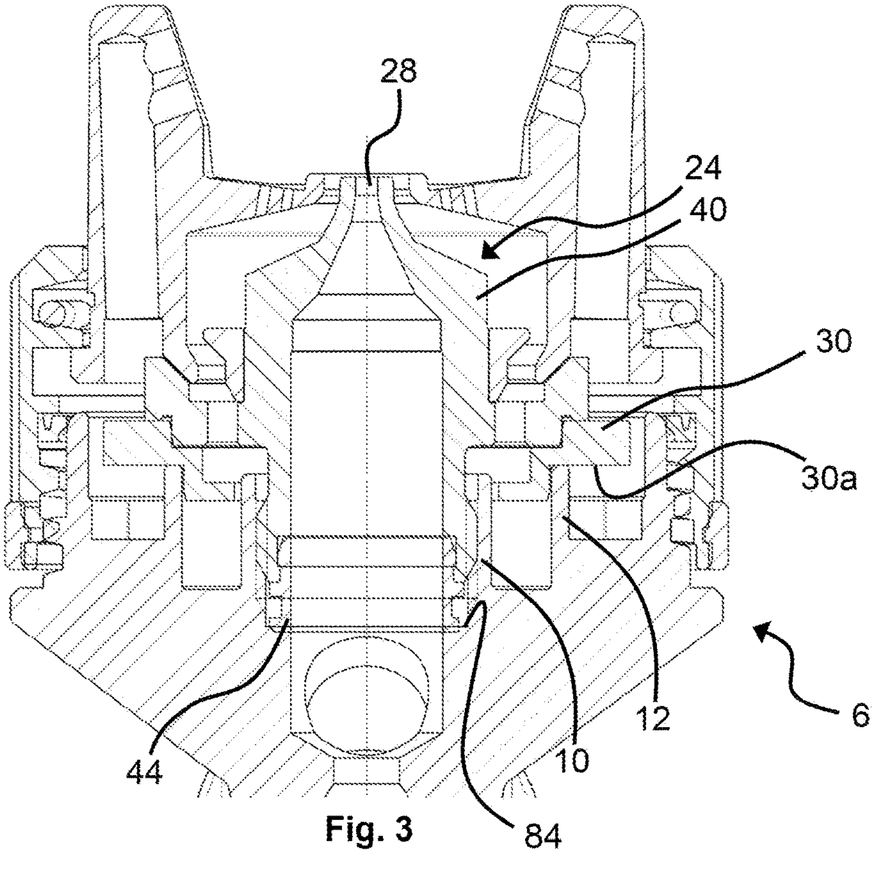
Fig. 3 (Prior Art)
FIG. 3 shows a sectional view of the head area of the spray gun according to the prior art.

FIG. 3 shows a sectional view of the head area 6 of a spray gun according to the prior art with the paint nozzle arrangement 24 with the sealing element 44 according to the prior art of FIG. 2 in the assembled state. The paint nozzle arrangement 24, which in the present case consists of a material nozzle 40 with various additional components, a paint outlet opening 28 and the sealing element 44, is screwed into the body 2 or its head area 6 via the external thread 46 shown in FIG. 2 and an internal thread 10 in the head area 6 of the body 2 of spray gun 1.

The sealing element 44 in the screwed-in paint nozzle arrangement 24 is pressed against a counter-sealing surface 84 and seals off the material-guiding area of the spray gun 1, in particular the transition area between the paint channel in the body 2 and the hollow section of the paint nozzle 40 for passage of the material being sprayed relative to the air-guiding area of the spray gun 1. The sealing element 44 then forms only an axially acting sealing surface with the body 2, namely against the counter-sealing surface 84.

FIG. 3 also shows an impact disk 30 with an impact surface 30*a* and a center wall 12 on the head area 6 of body 2. The significance of these components is explained further below.

Figure 4:
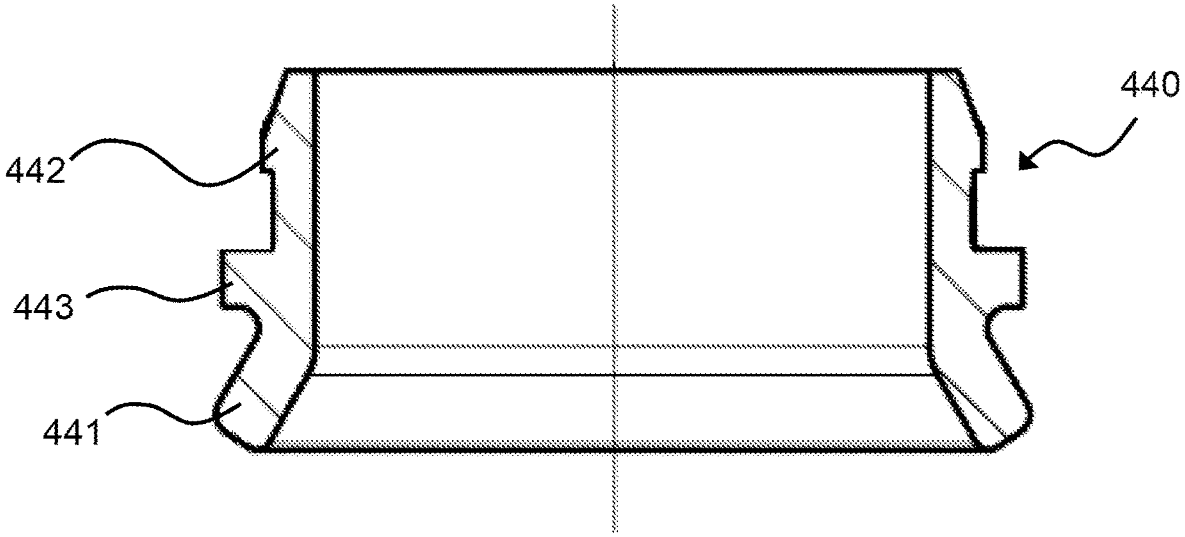
FIG. 4 shows a sectional view of an illustrative embodiment of a paint nozzle arrangement according to the disclosure or a sealing element according to the disclosure arranged on a paint nozzle in the unassembled state.

FIG. 4 shows an example of an illustrative embodiment of a sealing element 440 according to the disclosure designed as a paint nozzle seal. The sealing element 440 in the present case is arranged at the same position in a spray gun 1 as the sealing element 44 in the spray gun 1 of FIG. 1 and at the same position on a paint nozzle as the sealing element 44 on paint nozzle 40 of FIG. 2.

The sealing element 440 has a device on the front section for arrangement of the sealing element 440 on a paint nozzle 40, which in the present case can be the same paint nozzle 40 as the paint nozzle 40 shown in the previous figures, and the device for arrangement of the sealing element 440 in the present case is configured as a circumferential snap-in tab 442. An essentially cylindrical section located between the front and rear section of the sealing element 440 has a circumferential collar 443, which in the present case functions as a stop for positioning the sealing element 440 on the point nozzle 40. The sealing element 440 also has a rear section configured as a truncated hollow cone 441.

Figure 5:
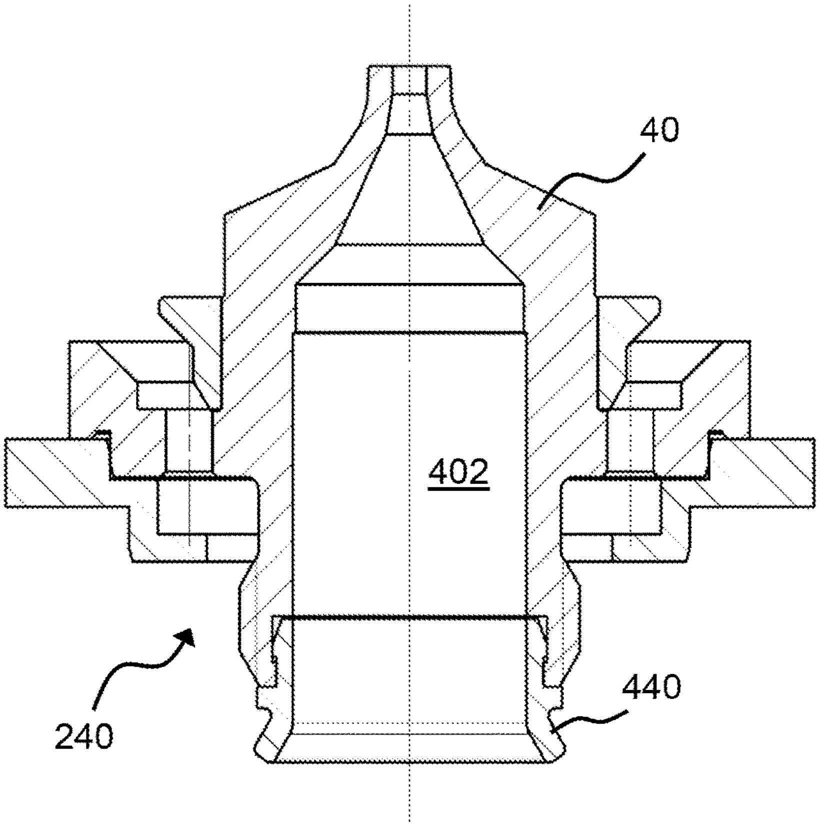
FIG. 5 shows a sectional view of an illustrative embodiment of a paint nozzle arrangement according to the disclosure or a sealing element according to the disclosure arranged on a paint nozzle in the unassembled state.

FIG. 5 shows an illustrative embodiment of a paint nozzle arrangement 240 according to the disclosure or a paint nozzle 40 with an illustrative embodiment of a sealing element 440 according to the disclosure arranged thereon. The paint nozzle 40 can be designed like the paint nozzle 40 of FIG. 2 and FIG. 3.

The inside diameter of the essentially cylindrical center section of the sealing element 440 and the inside diameter of the front section of the sealing element 440 are essentially the same as the inside diameter of the hollow cylindrical section 402 of the paint nozzle 40. A particularly undisturbed flow of the material being sprayed from the sealing element 440 into the essentially hollow cylindrical section 402 of the paint nozzle 40 is thus possible.

Figure 6:
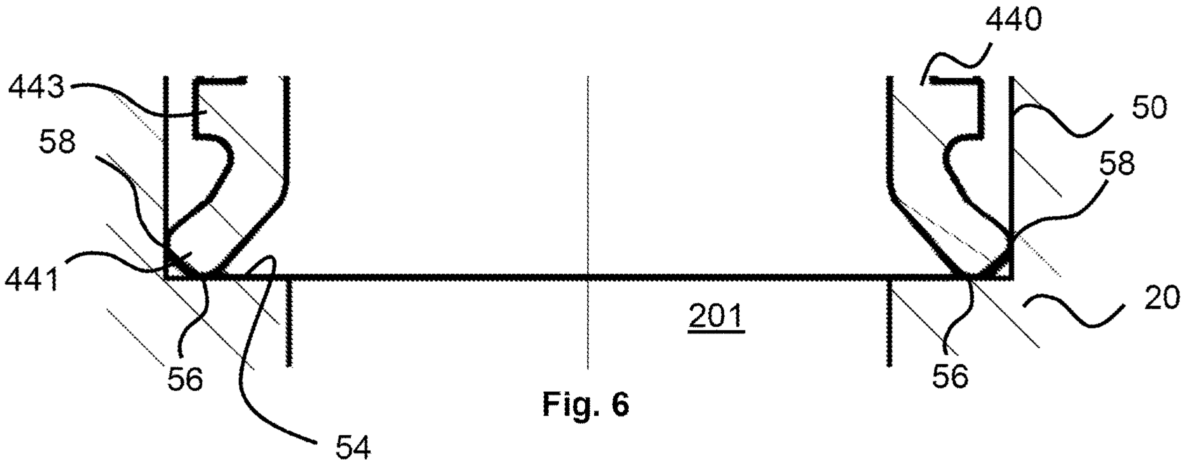
FIG. 6 shows a detail view of the area of effect of the illustrative embodiment of a sealing element according to the disclosure in the assembled, i.e., tightened, i.e., expanded state.

FIG. 6 shows a detail view of the effective area of an illustrative embodiment of a sealing element 440 according to the disclosure in the assembled, i.e., tightened, i.e., expanded state, i.e., with the paint nozzle arrangement 240 arranged, in particular screwed in, in particular tightened in the body 2 of a spray gun 1.

An area for accommodating an attachment for a body 20, in the present case the paint nozzle arrangement 240 of FIG. 5, has an essentially cylindrical wall section 50 with a shoulder 54 arranged at one end of the wall section 50, which in the present case is designed to be circumferential. The sealing element 440 forms an axially acting sealing surface 56 and a radially acting sealing surface 58 with the body 20. In particular, the sealing element 440 forms an axially acting sealing surface 56 with the shoulder 54 and a radially acting sealing surface 58 with the cylindrical wall section 50. For this purpose, the rear section of the sealing element 440 is designed as a hollow truncated cone 441. This hollow truncated cone 441 expands when the paint nozzle arrangement 240 is arranged, in particular tightened in the body 20, and thereby forms the radially acting sealing surface 58 with the body 20.

The inside diameter of the essentially cylindrical middle section of the sealing element 440 is essentially the same as the inside diameter of the paint channel 201 located upstream of the sealing element 440. As a result, in addition to the above-described undisturbed flow of the material being sprayed from sealing element 440 into the essentially hollow cylindrical section 402 of the paint nozzle 40, a particularly undisturbed flow of the material being sprayed from the paint channel 201 into the sealing element 440 is also possible. In addition, stages in which paint accumulates, dries out and can adversely affect the material flow and material quality, in particular the material purity, can thus be avoided.

The inside diameter of the essentially cylindrical wall section 50 in the present illustrative embodiment is somewhat larger than the outside diameter of the unexpanded sealing element 440 at its largest location. As already mentioned above, an easier arrangement is thereby possible, in particular screwing-in the paint nozzle arrangement 240 with the sealing element 440 into the body 20, since very little or no friction resistance need be overcome between the sealing element 440 and the cylindrical wall section 50. Wear of the sealing element 440, which in the case of a larger outside diameter of sealing element 440 would result from friction of the sealing element 440 on the cylindrical wall section 50, can also be avoided.

Apart from the sealing element 440, the components shown in FIGS. 1 to 3 can also be used in the present disclosure. For example, the paint nozzle arrangement 240 or the sealing element arranged on a paint nozzle 40 shown in FIG. 1 can be installed in the spray gun 1 instead of the paint nozzle arrangement 24 shown there or instead of the sealing element 44 shown there. In the present illustrative embodiment, an impact disk 30, in particular the impact surface 30*a* thereof and a middle wall 12 of the head area 6 of body 2 shown in FIG. 3 can form a stop for the paint nozzle arrangement 240, which also defines the maximum expansion of sealing element 440.

The above illustrative embodiment describes only a limited selection of possible implementations and therefore does not represent a restriction of the present disclosure.

What is claimed is:

1. A sealing element comprising:

a first section configured to mate with an attachment of a spray gun; and a second section comprising an expandable portion that widens at an end opposite the first section, the expandable portion configured to form an axially acting sealing surface and a radially acting sealing surface with a body of the spray gun when the attachment of the spray gun is arranged in the body.

2. The sealing element according to claim 1, wherein the expandable portion is configured to expand when the attachment is tightened in the body, to thereby form the radially acting sealing surface with the body.

3. The sealing element according to claim 1, wherein the first section comprises at least one device for arranging the sealing element on the attachment, and wherein the second section is configured as a hollow truncated cone.

4. The sealing element according to claim 3, wherein the at least one device is a snap-in tab.

5. The sealing element according to claim 4, wherein the snap-in tab is a circumferential snap-in tab.

6. The sealing element according to claim 1, wherein the expandable portion includes a flexible material.

7. The sealing element according to claim 6, wherein the flexible material is high-density polyethylene (HDPE).

8. The sealing element according to claim 1, wherein the expandable portion comprises:

a first surface configured to form the axially acting sealing surface when in contact with a first counter-sealing surface of the body; and a second surface configured to form the radially acting sealing surface when in contact with a second counter-sealing surface of the body.

9. A paint nozzle arrangement for a paint spray gun, the paint nozzle arrangement comprising:

a paint nozzle including:

a front end with a paint outlet opening, a rear end comprising a paint inlet opening, and a substantially hollow cylindrical section situated between the front end and the rear end; and a sealing element including:

a first section configured to mate with the paint nozzle, and a second section comprising an expandable portion that widens at an end opposite the first section, the expandable portion configured to form an axially acting sealing surface and a radially acting sealing surface with a body of the paint spray gun when the paint nozzle is arranged in the body.

10. The paint nozzle arrangement according to claim 9, wherein at least a portion of the sealing element has substantially the same inside diameter as the substantially hollow cylindrical section.

11. The paint nozzle arrangement according to claim 9, wherein the expandable portion is configured to expand when the paint nozzle is tightened in the body to thereby form the radially acting sealing surface with the body.

12. The paint nozzle arrangement according to claim 9, wherein the expandable portion comprises:

a first surface configured to form the axially acting sealing surface when in contact with a first counter-sealing surface of the body; and a second surface configured to form the radially acting sealing surface when in contact with a second counter-sealing surface of the body.

13. A paint spray gun comprising:

a body having at least one area for accommodating an attachment and including at least one area with a substantially cylindrical wall section that is at least partially threaded; and a sealing element including:

a first section configured to mate with the attachment, and a second section comprising an expandable portion that widens at an end opposite the first section, the expandable portion configured to form an axially acting sealing surface and a radially acting sealing surface with the body of the paint spray gun when the attachment is arranged in the body.

14. The paint spray gun according to claim 13, wherein the body further comprises a shoulder arranged at one end of the substantially cylindrical wall section.

15. The paint spray gun according to claim 14, wherein an inside diameter of at least one portion of the substantially cylindrical wall section is greater than or equal to an outside diameter of the sealing element.

16. The paint spray gun according to claim 14, wherein the sealing element is arranged between the body and the attachment and, when the attachment is arranged in the body, forms the radially acting sealing surface with the substantially cylindrical wall section and the axially acting sealing surface with the shoulder.

17. The paint spray gun according to claim 14, wherein the attachment is a paint nozzle.

18. The paint spray gun according to claim 13, further comprising a stop for the attachment that also limits expansion of the sealing element.

19. The paint spray gun according to claim 13, further comprising:

a paint spray nozzle as the attachment, the paint spray nozzle including:

a front end with a paint outlet opening, a rear end comprising a paint inlet opening, and a substantially hollow cylindrical section situated between the front end and the rear end.

20. The paint spray gun according to claim 13, wherein the expandable portion comprises:

a first surface configured to form the axially acting sealing surface when in contact with a first counter-sealing surface of the body; and a second surface configured to form the radially acting sealing surface when in contact with a second counter-sealing surface of the body.

* * * * *